Header omitted 3,221,210
CIRCUIT FOR INDICATING FAILURE IN AUTOMOBILE HEADLIGHTS CIRCUITS
John O. Mullings, 189—27 39th Ave., Flushing 58, N.Y.
Filed Apr. 24, 1963, Ser. No. 275,413
2 Claims. (Cl. 315—82)

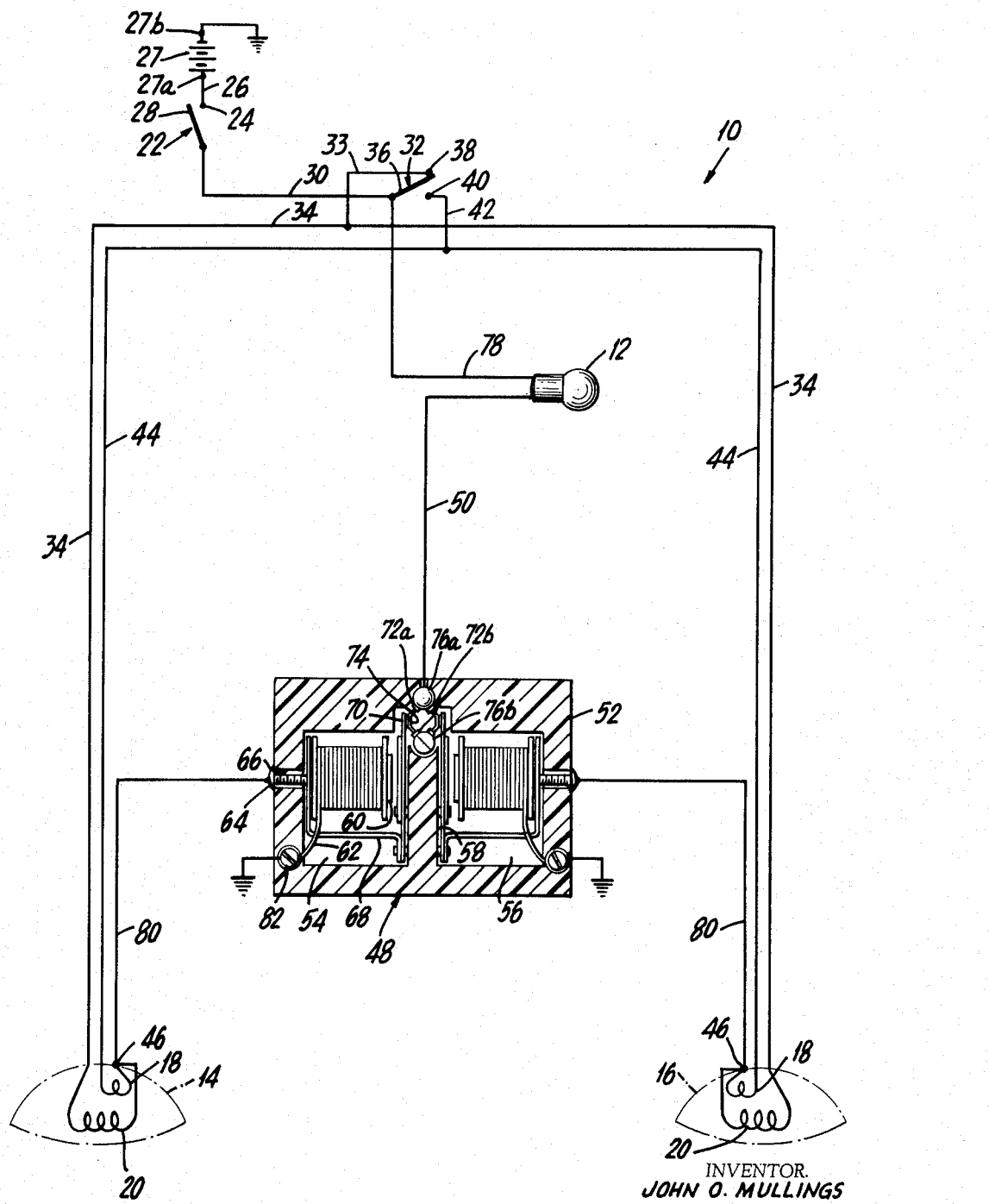

This invention relates to electric circuits for indicating whether a lamp is operating.

In automoitve vehicles, for example, it is often difficult for many drivers to know if their headlights are working, unless the driver actually gets out of the vehicle and directly observes the headlight. Indicating circuits heretofore proposed have been relatively complex and expensive to install in existing vehicles since the wiring of the vehicle often required considerable rearrangement.

It is an object of the present invention to provide an indicating circuit for an illuminating lamp wherein the existing wiring leading to the lamp need not be disturbed.

Another object is to provide an indicating circuit which is especialy useful in indicating defective headlights of automotive vehicles.

A further object is to provide an improved indicating circuit and improved switch means therefor.

The above and other objects, features and advantages of the invention will be more fully understood from the following description of the invention considered in connection with the accompanying illustrative drawing of an embodiment of the invention.

The figure of the drawing is a combined wiring and diagrammatic illustration of the invention.

Referring now to the drawing in detail, circuit 10 includes an indicator light 12 which is operable to indicate whether or not illuminating lamp 14 or 16 is operating. The lamps, as herein shown, are automotive headlamps each having low and high-beam filaments 18 and 20, respectively. More specificaly, and as will be more clearly understood hereinafter, the circuit is operable so that indicator light 12 is energized when either lamp 14 or 16 is inoperative due to the burning out of either of their respective filaments 18 and 20, or for some other reason.

The circuit includes a power on-off switch 22 which has a stationary contact 24 that is connected by a lead 26 to the power terminal 27a of the vehicle's battery 27 whose other terminal 27b is grounded. When the movable contact 28 of the switch is closed, power is transmitted through the switch and, in the position shown, to high-beam filaments 20 of lamps 14 and 16, via lead 30, foot-operated switch 32, and leads 33 and 34, respectively.

The foot-operated switch controls the operation of the filaments 18 and 20 and has a movable contact 36, connected to lead 30, and stationary contacts 38 and 40. Contact 38 is connected to lead 33 and contact 40 is connected by a lead 42, to leads 44 which are connected to the low-beam filaments 18 of the lamps. When switch 32 is in the position shown, the high-beam filaments are energized. When movable contact 36 engages stationary contact 40, the low-beam filaments 18 are energized and the high-beam filaments are de-energized. The common ground terminal for the filaments is indicated at 46.

In accordance with the invention, a magnetic switch device 48 is connected to the ground terminals 46 of the lamps 14 and 16 as well as to the ground lead 50 of indicator light 12. It is to be observed that the wiring for lamps 14 and 16, heretofore described, need not be disturbed to install device 48 in existing vehicles so that the indicator circuit can be easily and inexpensively installed in existing vehicles. Device 48 may be installed readily on a convenient grounded part of the vehicle while lamp 12 is preferably installed on the dashboard of the vehicle.

Switch device 48 comprises a housing 52 of non-conducting material and which is divided into two compartments 54 and 56 by a wall 58. Each compartment contains an iron core 60 having an electric winding 62 coiled around it. The core is mounted in its compartment by an electrically conducting screw 64 which extends through an aperture 66 in the corresponding side of the housing and is connected, in a suitable manner and in electrically non-conducting relation, with an L-shaped member 68. Member 68 is suitably connected to core 60, in electrically non-conducting relation therewith, and the lower end of the member is connected, in electrically non-conducting relation, to the lower end of a movable magnetic spring contact arm 70. The upper end of the arm carries a pair of contacts 72a and 72b which are electrically connected to each other by bar 74.

A pair of stationary contacts 76a and 76b are suitably mounted on housing 52, in electrical non-conducting relation with each other, and in position to be normally contacted by corresponding contacts 72a and 72b of either contact arm 70. Contact 76a is connected to ground lead 50 of indicator light 12 which is connected to the power lead 30 by a lead 78. Contact 76b is connected to ground. The ground terminals 46 of the headlamps are connected to the companion screws 64 of the switch device by leads 80 and each screw is connected to one end of the companion winding 62, while the opposite end of the winding is connected to a companion grounded screw 82 which may also be used as the mounting screws for device 48. The operation of the circuit will now be described in detail.

To operate lamps 14 and 16, switch 22 is closed to energize the high-beam filaments 20 through a circuit which may be traced as follows: battery 27, closed switch 22, lead 30, engaged contacts 36 and 38 of switch 32, leads 33 and 34, respectively, filament 20, lead 80, screw 64, winding 62, screw 82 and back to the battery through ground. Energization of the winding 62 magnetizes its core 60 to attract arm 70 so that contacts 72a and 72b are disengaged from contacts 76a and 76b whereby the energization circuit for indicator light 12 is open. The circuit for the indicator light can be traced as follows: battery 27, closed switch 22, leads 30 and 78, respectively, light 12, lead 50, now disengaged contacts 76a, 72a, 72b and 76b, respectively, and back to the battery through ground. If switch 32 is in its other position, contacts 36 and 40 are engaged to energize the low-beam filaments 18 and the circuit operates in the same manner as just described.

In the event that either one of filaments 20 or either one of filaments 18 burns out, the winding 62 of the companion core is de-energized to release the corresponding arm 70 and contacts 72a and 72b are engaged with contacts 76a and 76b to close the energization circuit for indicator lamp 12 which is then energized and indicates to the observer that either one or both of the filaments 18 and 20 is burned out.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

I claim:

1. An electric circuit, comprising power supply means having a power terminal and a ground terminal, an illuminating lamp having a power terminal and a ground terminal, an electric indicator having a power terminal and a ground terminal, means for electrically connecting said power terminals of said illuminating lamp and said indicator to said power terminal of said power supply means, and means electrically connected to said ground terminals of said indicator, said illuminating lamp and said power supply means for energizing said indicator when said illuminating lamp is de-energized and for de-energizing said indicator when said illuminating lamp is energized, said last mentioned means comprising an electromagnetic device having a magnetic core, an energizing winding on said magnetic core, and a movable contact operable in response to energization of said winding, one terminal of said winding being electrically connected to said ground terminal of said illuminating lamp and the other terminal of said winding being electrically connected to said ground terminal of said power supply means, a pair of stationary contacts positioned to be contacted by said movable contact when said winding is de-energized and to be disengaged by said movable contact when said winding is energized, one of said stationary contacts being electrically connected to said ground terminal of said indicator, and said other stationary contact being electrically connected to said ground terminal of said power supply means.

2. An electromagnetic device, comprising a support of electrically non-conducting material, a magnetic core mounted on said support, an energizing winding mounted on said core and having a terminal adapted to be connected to the ground terminal of an illuminating lamp and having another terminal adapted to be connected to ground, a magnetic arm mounted for movement in response to energization of said winding and having a pair of spaced contacts in electrically conducting relation with each other, a pair of corresponding spaced stationary contacts electrically insulated from each other and in position to be simultaneously contacted by said movable pair of spaced contacts when said winding is de-energized, one of said stationary contacts being adapted to be electrically connected to the ground terminal of an electric indicator and the other of said stationary contacts being adapted to be connected to ground.

References Cited by the Examiner
UNITED STATES PATENTS

| | | | |
|---|---|---|---|
| 549,136 | 11/1895 | Kinsman | 315—83 |
| 2,285,544 | 6/1942 | Trogan | 340—373 |
| 2,693,551 | 11/1954 | Hall | 315—83 |
| 2,941,196 | 6/1960 | Gelli | 340—52 |

GEORGE N. WESTBY, *Primary Examiner.*

NEIL C. READ, *Examiner.*